United States Patent
Azad

(10) Patent No.: US 8,185,678 B1
(45) Date of Patent: May 22, 2012

(54) METHOD AND APPARATUS FOR CONTROLLING A DATA BUS

(75) Inventor: Sarosh I. Azad, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 21 days.

(21) Appl. No.: 12/488,389

(22) Filed: Jun. 19, 2009

(51) Int. Cl.
*G06F 13/00* (2006.01)
*G06F 1/26* (2006.01)
*G06F 1/32* (2006.01)
*G06F 1/00* (2006.01)

(52) U.S. Cl. ......... 710/104; 713/320; 713/322; 713/323
(58) Field of Classification Search .................. 710/104; 713/320, 322–324
See application file for complete search history.

(56) References Cited

U.S. PATENT DOCUMENTS

| | | | | |
|---|---|---|---|---|
| 5,412,519 A | * | 5/1995 | Buettner et al. | 360/73.03 |
| 5,612,869 A | * | 3/1997 | Letzt et al. | 705/3 |
| 5,631,935 A | * | 5/1997 | Ginossar | 709/233 |
| 5,721,935 A | * | 2/1998 | DeSchepper et al. | 713/323 |
| 6,000,035 A | * | 12/1999 | Matsushima et al. | 713/320 |
| 6,678,831 B1 | * | 1/2004 | Mustafa et al. | 713/323 |
| 6,708,278 B2 | * | 3/2004 | Howard et al. | 713/323 |
| 6,883,104 B2 | * | 4/2005 | Rosch | 713/322 |
| 7,287,175 B2 | * | 10/2007 | Vereen et al. | 713/323 |
| 7,328,037 B2 | * | 2/2008 | Tsien et al. | 455/522 |
| 7,392,409 B2 | * | 6/2008 | Tateyama | 713/310 |
| 7,515,996 B2 | * | 4/2009 | Wald | 700/300 |
| 7,710,868 B2 | * | 5/2010 | Tsukizawa | 370/229 |
| 8,069,293 B1 | * | 11/2011 | Rogan et al. | 710/301 |
| 2004/0003296 A1 | * | 1/2004 | Robert et al. | 713/300 |
| 2007/0124627 A1 | * | 5/2007 | Katano et al. | 714/708 |
| 2008/0273219 A1 | * | 11/2008 | Roantree | 358/1.15 |
| 2008/0288799 A1 | * | 11/2008 | Branover et al. | 713/323 |
| 2009/0113224 A1 | * | 4/2009 | Mok et al. | 713/323 |
| 2009/0199031 A1 | * | 8/2009 | Zhang et al. | 713/323 |
| 2009/0291713 A1 | * | 11/2009 | Tsukamoto et al. | 455/574 |
| 2011/0182216 A1 | * | 7/2011 | Ono et al. | 370/282 |

FOREIGN PATENT DOCUMENTS

| | | | |
|---|---|---|---|
| JP | 06102961 A | * | 4/1994 |
| JP | 07264263 A | * | 10/1995 |
| JP | 10031531 A | * | 2/1998 |
| JP | 2000039930 A | * | 2/2000 |
| JP | 2011188011 A | * | 9/2011 |

OTHER PUBLICATIONS

"NN9009474: Technique for Monitoring a Computer System's Activity for the Purpose of Power Management of a DOS-Compatible System", Sep. 1, 1990, IBM, IBM Technical Disclosure Bulletin, vol. 33, Iss. 4, pp. 474-477.*

(Continued)

*Primary Examiner* — Faisal M Zaman
(74) *Attorney, Agent, or Firm* — LeRoy D. Maunu; Thomas George

(57) ABSTRACT

A method and apparatus for controlling a data bus system is provided. A data bus system may use different hardware to perform transceiver and system control functions. The various embodiments of the invention increase compatibility of a data bus system with different transceiver hardware configurations by configuring the data transmission rate of the transceiver hardware at various points of operation to prevent or remedy several situations where the transceiver hardware may operate at a different data transmission rate than that used by the data bus system.

10 Claims, 8 Drawing Sheets

OTHER PUBLICATIONS

Melear, C., "Hardware and software techniques for power conservation in portable devices," WESCON/94. 'Idea/Microelectronics'. Conference Record, pp. 453-461, Sep. 27-29, 1994.*

Liu et al., "An ultra low power baseband transceiver IC for wireless body area networks," Medical Devices and Biosensors, 2008. ISSS-MDBS 2008. 5th International Summer School and Symposium on, pp. 231-234, Jun. 1-3, 2008.*

Kato et al., "A very low power and high-quality signal transmission baseband LSIC for personal communications-advanced signal processing and one-channel integration," Global Telecommunications Conference, 1994. GLOBECOM '94. Communications: The Global Bridge., IEEE, vol. 2, pp. 1019-1023 vol. 2, Nov. 28-Dec. 2, 1994.*

Intel Corp., *PHY Interface for the PCI Express Architecture*, Sep. 28, 2006, pp. 1-38, Draft Revision 1.87, available from Intel Corp., Santa Clara, California, USA.

PCI-SIG, *PCI Express Base Specification Revision 2.0*, Dec. 20, 2006, pp. 1-608, available from PCI-SIG, www.pcsig.com, Beaverton, Oregon, USA.

PCI-SIG, *Errata for the PCI Express Base Specification Revision 2.0*, Jul. 7, 2008, pp. 1-56, available from PCI-SIG, www.pcsig.com, Beaverton, Oregon, USA.

* cited by examiner

METHOD AND APPARATUS FOR CONTROLLING A DATA BUS

FIELD OF THE INVENTION

The present invention generally relates to a system for controlling a data bus.

BACKGROUND

In designing a circuit to perform a certain task, it is common to use existing hardware to accomplish a portion of the task. A data bus system may use different hardware to perform transceiver and system control functions. Because transceiver hardware is configured by controller hardware, in designing a data bus system a transceiver and a controller must be selected so they interoperate using compatible commands and operational protocols. A controlling system which is compatible with transceiver hardware of various configurations is advantageous in that it presents a manufacturer of the circuit with a greater selection of options for implementing hardware that can be changed based on market price and availability conditions.

The present invention addresses the compatibility between the data bus controlling system and the implementing hardware of a transceiver.

SUMMARY

An embodiment of a method of operating a data bus controller coupled to a bus comprises: monitoring the bus for presence of a device while the bus controller is in a first state, and transitioning to a second state in response to presence of a device on the bus; while the bus controller is in the second state, opening, configuring and monitoring communications with devices coupled to the bus, and further communicating with the devices at two or more transmission rates including a first rate that is lower than a second rate; transitioning the bus controller from the second state to a third state in response to conditions on the bus indicating that all communications on the bus have ceased or need to be stopped; and closing communication channels, and configuring the controller to operate at the first transmission rate while the bus controller is in a third state, and transitioning the bus controller into the first state following configuration of the transmission rate.

This embodiment of the method further comprises configuring the controller, while the controller is in the third state, to operate in a low power mode. The act of configuring the controller to operate at the first transmission rate can comprise: detecting the current transmission rate; and setting the transmission rate to the first rate if a higher rate is detected. The act of setting the transmission rate can comprise: sending a control signal from the controller to a transceiver circuit; and waiting to set the transmission rate until the transceiver circuit sends a signal confirming configuration of transmission rate has completed. The act of configuring the controller to operate in a low power mode can comprise: sending a control signal from the controller to a transceiver circuit; and waiting to configure the controller to operate in the low power mode until the transceiver sends a signal confirming transceiver is operating in an idle transmission state.

Another embodiment of a method of operating a controller of a transceiver coupled to a bus, comprises: monitoring the bus for presence of a device while the bus controller is in a first state, and transitioning to a second state in response to presence of a device on the bus; while the controller is in a second state, configuring the transceiver to operate at one of two or more transmission rates, and transitioning into a third state once configuration is complete; while the controller is in the third state, opening, closing, configuring and monitoring transceiver communications with devices coupled to the bus, and further operating the transceiver to communicate with the devices on the bus; and transitioning the controller from the third state to the first state in response to conditions on the bus indicating that all communications on the bus have ceased or need to be stopped.

In this embodiment, the act of setting the transmission rate of the transceiver can comprise: sending a control signal from the controller to the transceiver, and waiting until the transceiver sends a signal confirming configuration of transmission rate has completed.

An embodiment of a data bus circuit, comprises: a transceiver circuit that operates in a first data rate or a second data rate; and a controller circuit, coupled to the transceiver circuit, wherein the controller circuit sets the transceiver to a plurality of states, including an idle transmission state or an active transmission state. The controller circuit configures the transceiver circuit to operate at the first data rate prior to entering into the idle transmission state.

In this embodiment, the first data rate can be lower than the second data rate. The controller circuit can operate in a plurality of states, including an idle transmission state or an active transmission state. The controller circuit can configure the transceiver circuit to operate at the first data rate when the controller circuit exits any state immediately preceding entry into the controller circuit's idle transmission state. The controller circuit can implemented on a field programmable gate array. Alternatively, the controller circuit can be implemented on a processor computing arrangement. The controller circuit can be implemented on a microcontroller. The controller circuit can configure the transceiver circuit to operate in a low power mode. The controller circuit can detect the current transmission rate of the transceiver circuit; and can configure the transmission rate of the transceiver circuit to the first rate in response to the detection of a different rate. The controller circuit can configure the transceiver circuit by: sending a control signal from the controller circuit to a transceiver circuit; and waiting until the transceiver circuit sends a signal confirming configuration has completed.

It will be appreciated that various other embodiments are set forth in the Detailed Description and Claims which follow.

DETAILED DESCRIPTION

In some data bus systems, which employ multiple transmission rates for communicating over the data bus, upon entering an idle monitoring or power saving state, existing hardware that performs the function of a transceiver may be designed to operate as follows: 1) to configure itself to operate at the lowest available transmission rate over the bus; 2) to operate at the lowest available transmission rate over the bus in accordance with an established specification; or 3) to continue to operate at the transmission rate the transceiver was operating at prior to entering an idle monitoring or power saving state. Where a controller and a transceiver employ different policies for configuring the data transmission rate when operating in an idle monitoring state, the system can become unstable when the controller and the transceiver each believe the transceiver is operating at a different rate of communication. The present invention increases compatibility of a data bus controller with transceiver hardware of various configurations and achieves an advance in the art by providing a method and circuit which effectively configure and synchronize the controller with the transceiver immediately before entering, or after leaving, an idle monitoring state.

Figure 1:
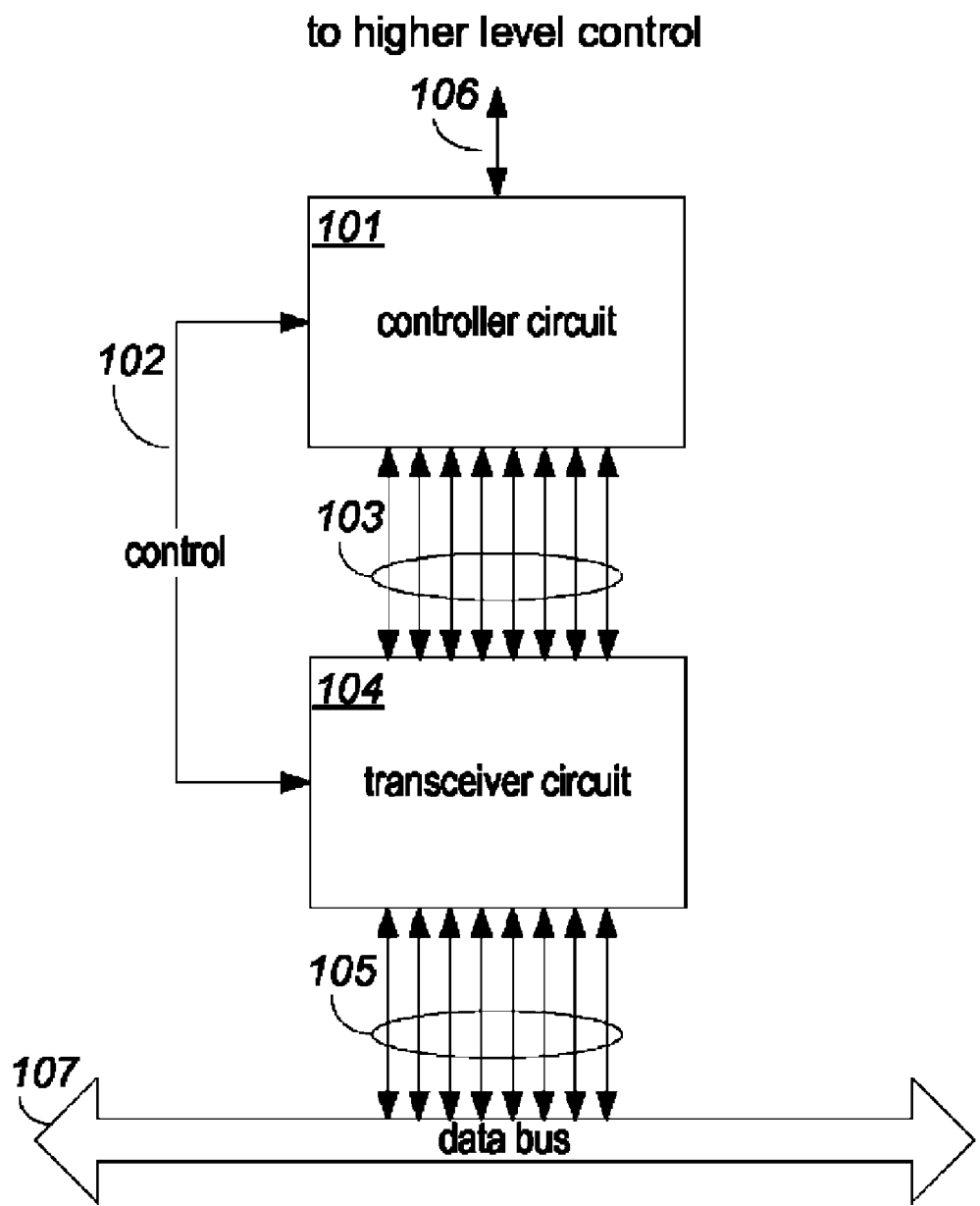
FIG. 1 is a block diagram of circuitry for operating a data bus controller in accordance with various embodiments of the invention.

FIG. 1 illustrates a block diagram of circuitry of a bus control arrangement in accordance with various embodiments of the invention. A controller circuit 101 is connected to a transceiver circuit 104 through data lines 103. Transceiver circuit 104 transmits over a data bus 107 through data lines 105, and controller circuit 101 sends and receives data to/from higher level control software and/or hardware through source line 106.

In various embodiments of the invention the controller circuit 101 is configured to send signals to the transceiver circuit 104, via control line 102, to set the transceiver circuit 104 into a plurality of operational states including a monitoring or idle transmission state, where the transceiver does not transmit data over the bus. Prior to entering a monitoring or idle transmission state, the controller circuit 101 is configured to send a control signal to the transceiver circuit 104, via control line 102, to operate in the lowest of the transceiver's available data transmission rates.

Figure 2:
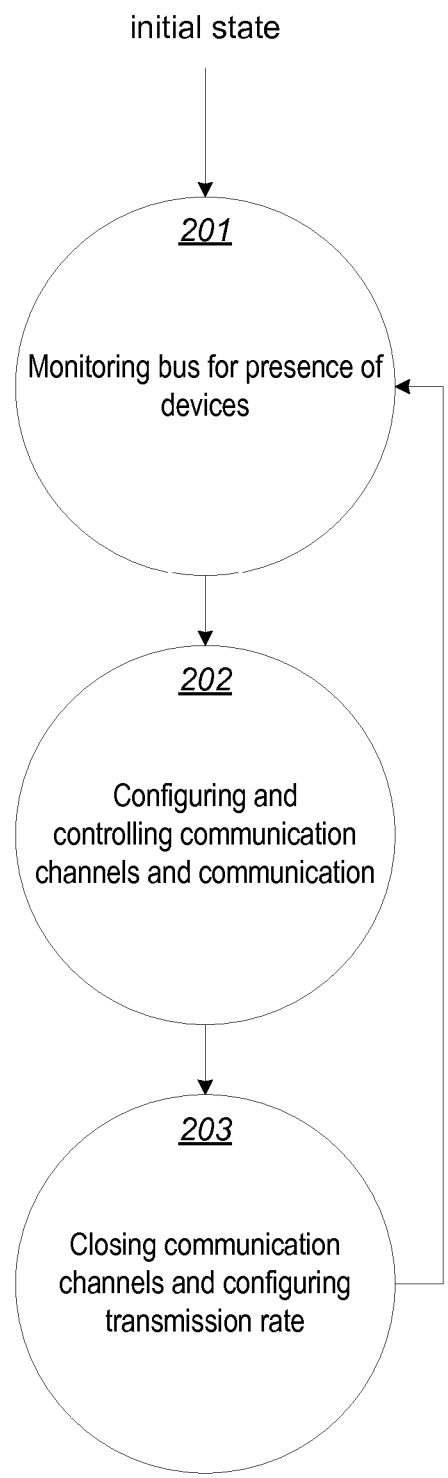
FIG. 2. is a flow diagram of a process for operating a data bus controller in accordance with various embodiments of the invention, wherein the transmission rate of the system is configured prior to entering an idle monitoring state.

FIG. 2 is a state diagram that describes operations of a data bus controller in accordance with one embodiment of the invention. The data bus controller operates in the following three generalized states: state 201 for monitoring for the presence of devices, state 202 for configuring and controlling communication channels and communicating over the bus, and state 203 for closing communication channels and configuring the transmission rate of the system. Some embodiments will refer to communication channels as data links or data lanes and are used interchangeably herein.

In state 201, the controller operates in an idle transmission state until a certain timeout occurs or a device on the bus or a higher level of control initiates communication, at which time the system transitions into state 202. In state 202, the system opens, configures, and monitors communications on the bus and communicates with devices on the bus. When communications cease or need to be terminated the system transitions to state 203. In state 203, the controller prepares the system to enter state 201, configures the system to operate in the lowest available data transmission rate, and transitions to state 201.

Figure 3:
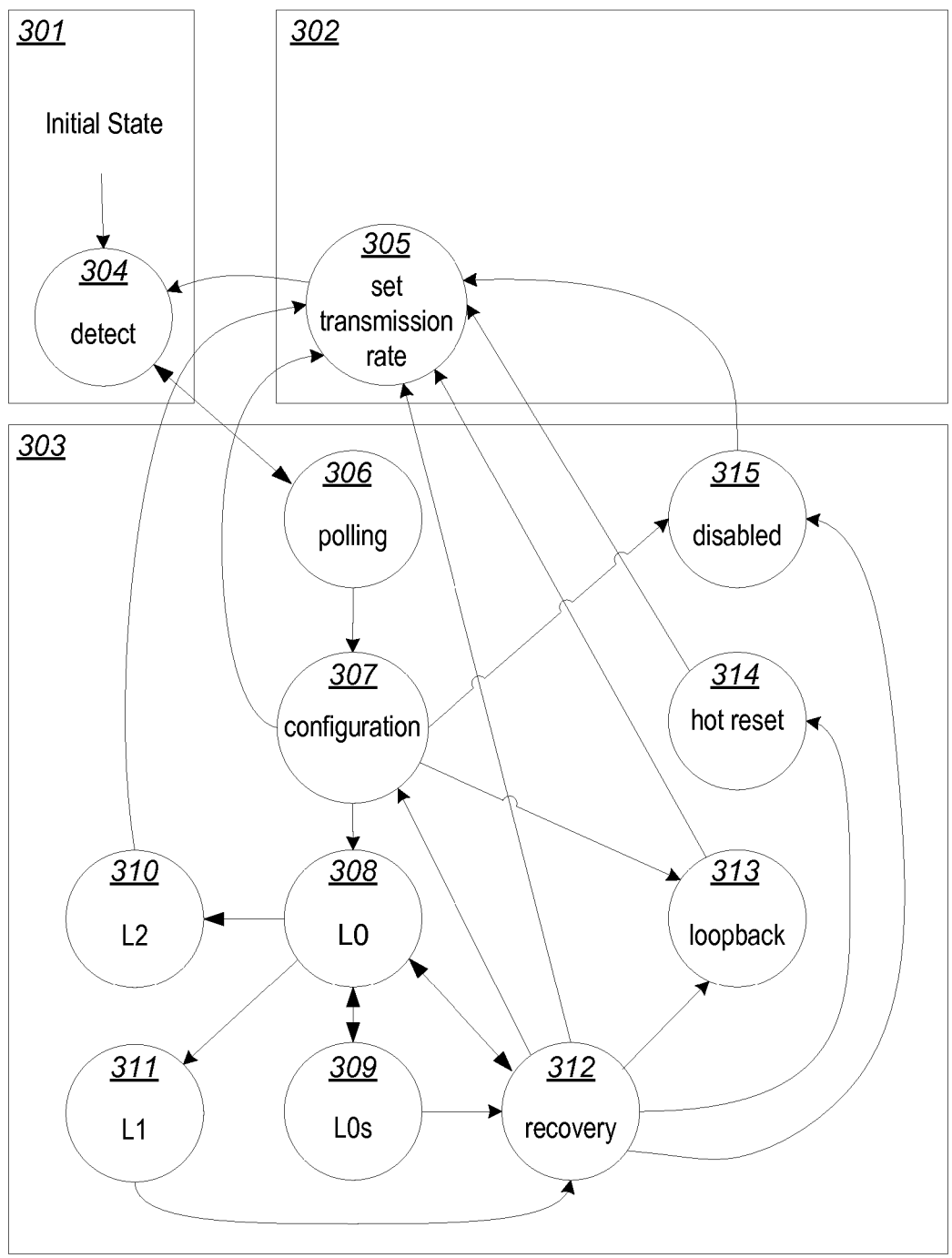
FIG. 3. illustrates a flow diagram in which a particular bus architecture has been adapted to operate in accordance with an example embodiment of the invention.

FIG. 3 illustrates an adaptation of a PCI Express 2.0 ("PCI Express") state machine in accordance with one embodiment of the invention. In the example embodiment, states 301, 303, and 302 correspond to states 201, 202, and 203 of FIG. 2 respectively. In this embodiment, state 301 contains PCI Express sub-state 304. In sub-state 304, the transceiver remains in an idle transmission state until the bus is no longer idle or, upon a specified timeout, the transceiver applies a voltage to a line on the bus to detect the presence of a device on the bus.

Sub-state 305, contained in state 302, increases the compatibility of a data bus controller by configuring and synchronizing the data transmission rate of the system before entering state 301. This is useful where behavior or requirements of some transceiver hardware is not accounted for by a PCI Express compliant controller. In this sub-state, open data lanes are closed and the transceiver is configured to operate at the lowest PCI express data transmission rate. In some embodiments, this sub-state may also put the transceiver into a power saving state of operation.

State 303 contains PCI Express sub-states 306, 307, 308, 309, 310, 311, 312, 313, 314, and 315 which open, configure, and monitor communications on the bus and communicate with devices on the bus. In the polling sub-state 306, the bus controller polls data lanes on those devices detected in the detect sub-state 304 and prepares for negotiation and configuration of the data lanes which takes place in configuration sub-state 307. Once data lanes with devices present are configured, the system generally operates in sub-states L0 308, L0s 309, L2 310, and L1 311 in which data are transmitted and received over the bus at various power levels depending on the sub-state. When an error renders a data link inoperable, the recovery sub-state 312 is entered to take necessary recovery action. From the recovery state 312, the controller transitions to the proper state to reestablish the data lane. The hot reset sub-state 314 is entered if a higher level control or remote device on the data bus signals a reset. If an error is detected on a data lane and cannot be cleared, the lane will be disabled in the sub-state 315. This sub-state allows a configured data lane to be disabled due to conditions on the bus such as the surprise removal of the remote device. The loopback sub-state 313 is a testing and debugging feature, where data received is transmitted back to the sender. Set transmission rate sub-state 305 closes established data lanes, configures the system to operate at the lower of the available transmission rates, and places the transceiver into an idle transmission mode.

Figure 4:
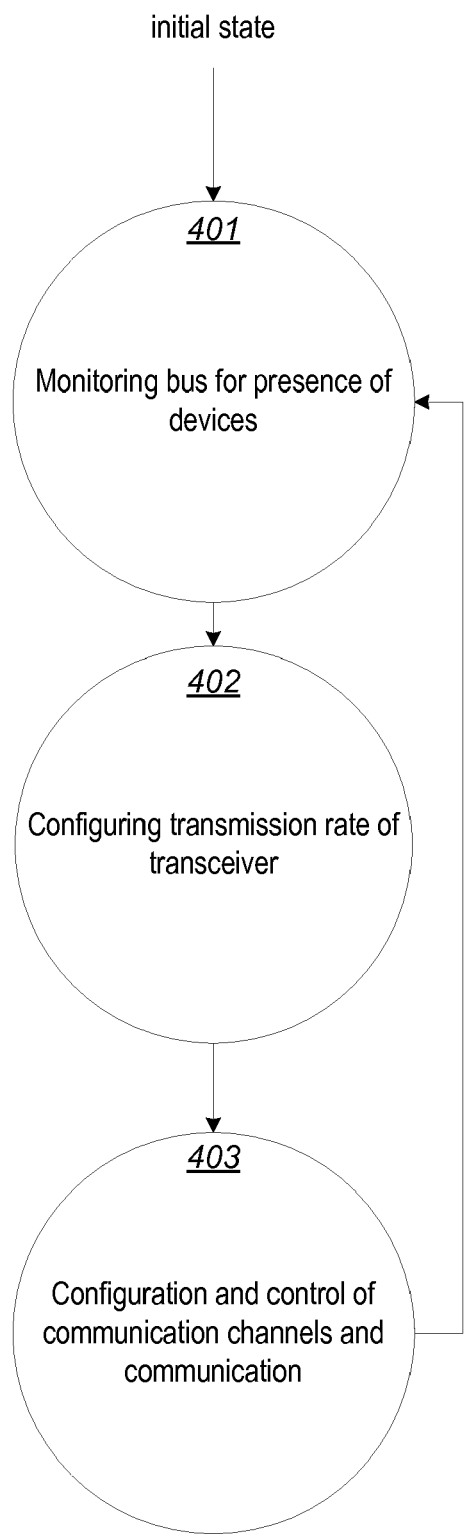
FIG. 4. is a flow diagram of a process for operating a data bus controller in accordance with various embodiments of the invention, wherein the transmission rate of the system is configured and synchronized upon exiting an idle monitoring state.

FIG. 4 is a state diagram of a data bus controller in accordance with an alternative embodiment of the invention. The process includes three generalized states: monitoring for the presence of devices 401, configuring the transmission rate of the system 402, and the configuration and control of communication channels and communicating over the bus 403.

In state 401, the controller operates in an idle transmission state until a device on the bus or a higher level of control initiates communication or a certain timeout occurs, at which time the system transitions into state 402. In state 402 the system is configured as a whole to operate at the same data transmission rate. Once configured, the system transitions to state 403. In state 403, the system opens, configures, and monitors communications on the bus and communicates with devices on the bus. When communications cease or need to be terminated the system transitions to state 401.

This embodiment differs from that shown in FIG. 2 in that the configuration and synchronization of the transmission rate occur upon exit of the idle monitoring state rather than before entering the idle monitoring state. The embodiment of FIG. 4 addresses a scenario in which the controller and transceiver may have gone out of synchronization in the expected data transmission rate. Whereas the embodiment of FIG. 2 prevents the controller and transceiver from going out of synchronization.

Figure 5:
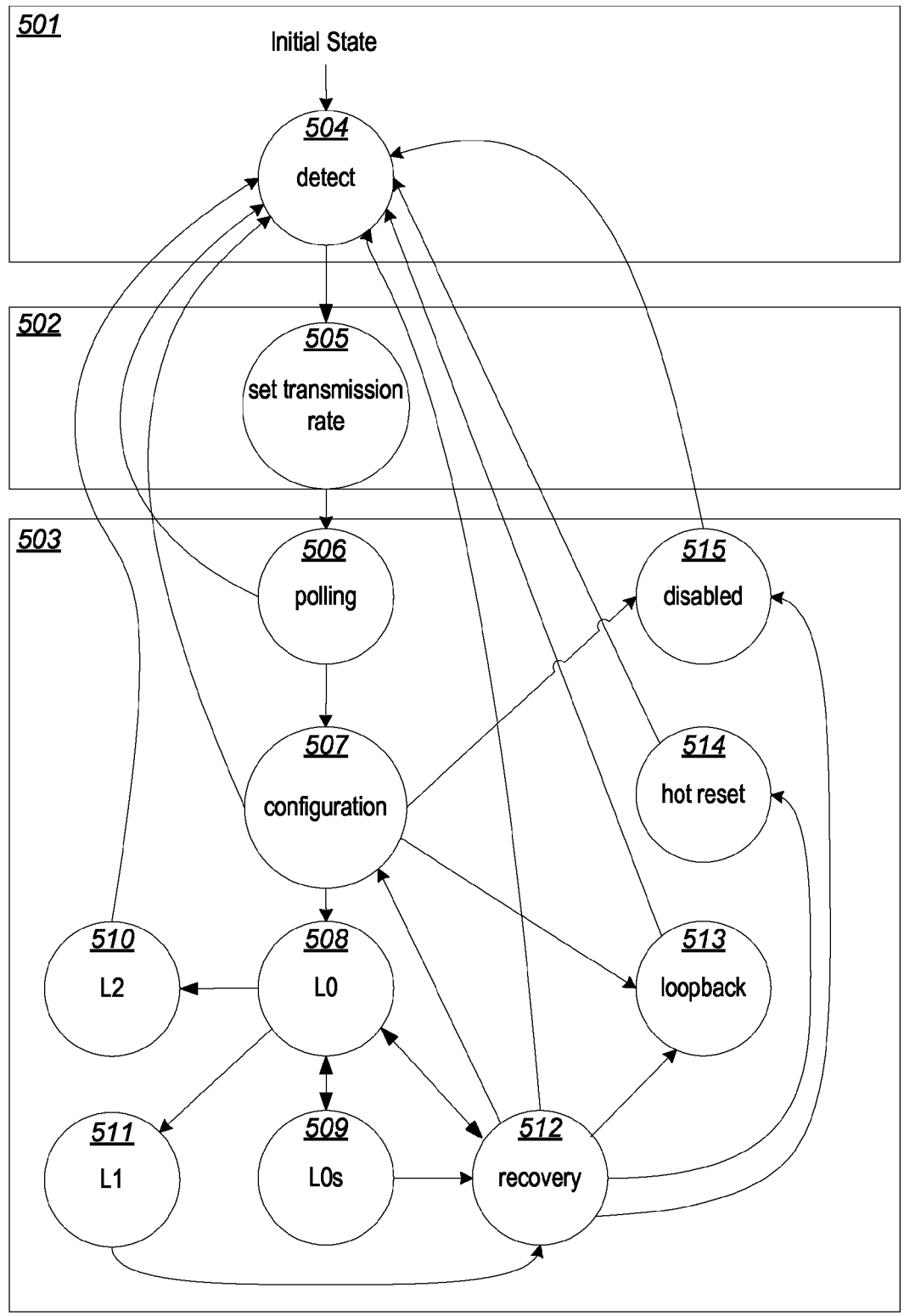
FIG. 5. illustrates a flow diagram in which a particular bus architecture has been adapted to operate in accordance with another embodiment of the invention.

FIG. 5 illustrates an adaptation of a PCI Express 2.0 ("PCI Express") state machine in accordance with another embodiment of the invention. In the example embodiment, states 501, 502, and 503 correspond to states 401, 402, and 403 of FIG. 4 respectively. State 501 contains PCI Express sub-state 504. In sub-state 504, the transceiver remains in an idle transmission state until the bus is no longer idle or, upon a specified timeout, the transceiver applies a voltage to a line on the bus to detect the presence of a device on the bus.

Sub-state 505, contained in state 502, increases the compatibility a data bus controller by configuring and synchronizing the data transmission rate of the system after leaving state 501. This is useful where behavior or requirements of some transceiver hardware is not accounted for by the PCI Express-compliant bus controller, thereby causing the data transmission rates of the controller and transceiver to become unsynchronized. In this sub-state the transceiver is configured to operate at the same PCI express data transmission rate as the controller. In some embodiments this sub-state may also put the transceiver into a power saving state of operation.

State 503 contains PCI Express sub-states 506, 507, 508, 509, 510, 511, 512, 513, 514, and 515 which open, configure, and monitor communications on the bus and communicate with devices on the bus. In the polling sub-state 506 the bus controller polls data lanes on those devices detected in the detect sub-state 504 and prepares for negotiation and configuration of the data lanes which takes place in configuration sub-state 507. Once data lanes with devices present are configured, the system generally operates in sub-states L0 508, L0s 509, L2 510, and L1 511 in which data are transmitted and received over the bus at various power levels depending on the sub-state. When an error renders a data link inoperable, the recovery sub-state 512 is entered to take necessary recovery action. From the recovery state 512, the controller transitions to the proper state to reestablish the data lane. The hot reset sub-state 514 is entered if a higher level control or remote device on the data bus signals a reset. If an error is detected on a data lane and cannot be recovered from, the device may be disabled in the sub-state 515. This sub-state allows a configured data lane to be disabled due to conditions on the bus such as the surprise removal of the remote device. The loopback sub-state 513 is a testing and debugging feature, where data received is transmitted back to the sender. Set transmission rate sub-state 505 closes established data lanes, configures the system to operate at the lower of the available transmission rates, and places the transceiver into an idle transmission mode.

Figure 6:
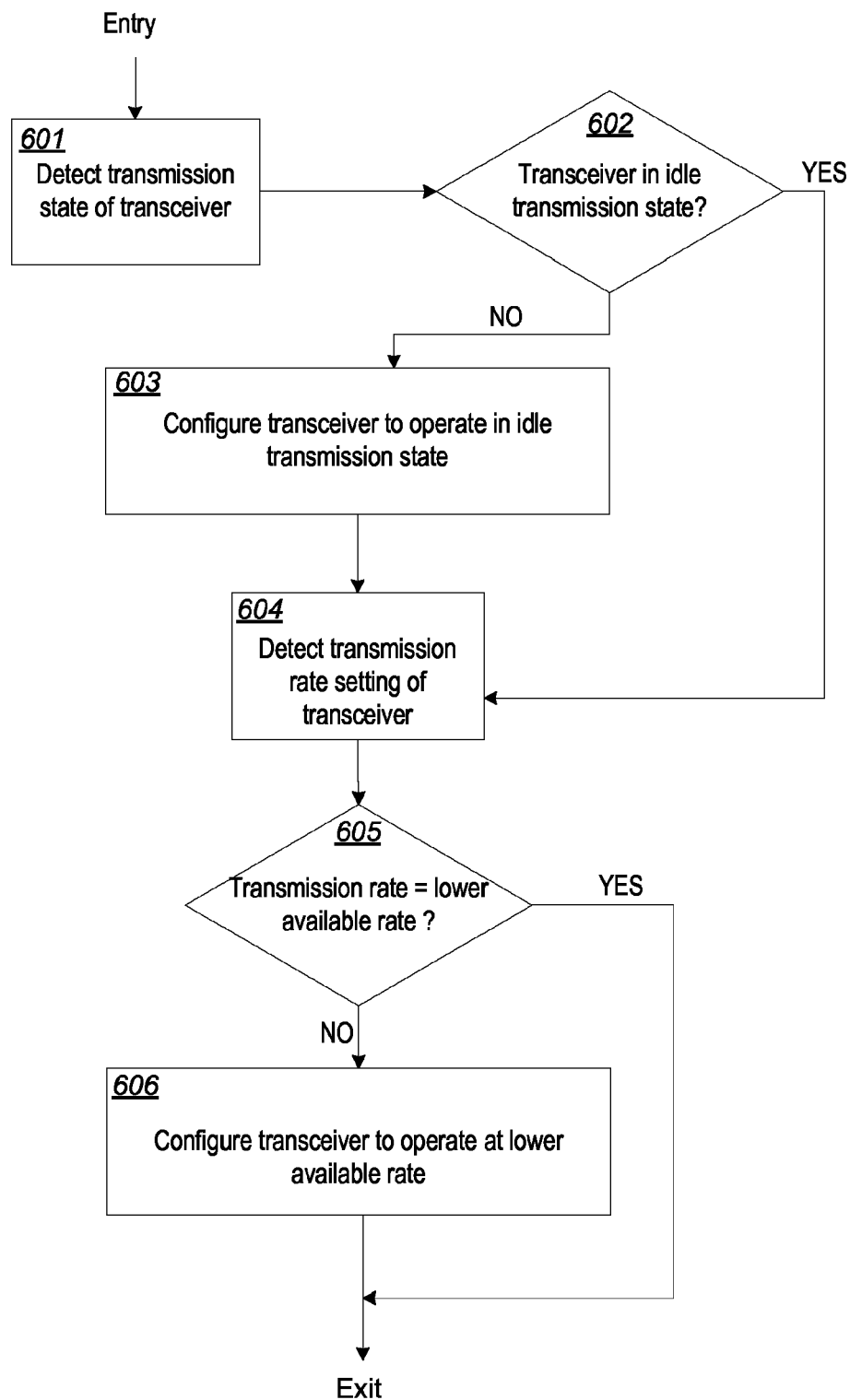
FIG. 6. illustrates a flow diagram of a process for configuring a data bus controller to operate at the lower of two transmission rates in accordance with various embodiments of the invention.

FIG. 6 illustrates a flow diagram of a process for configuring a data bus controller to operate at the lower of two transmission rates in accordance with various embodiments of the invention. At step 601, the process detects whether the transceiver is in a state of transmission. The detection in step 601 may be performed by a number of means including: monitoring the data bus for communications, sending a signal to the transceiver, or implementing hardware to prompt a reply containing information on the current transmission state. Upon detecting the state of transmission, at steps 602 and 603, if the transceiver is not in an idle transmission state, the transceiver is configured to operate in an idle transmission state. At step 604, the process detects the current transmission rate setting of the transceiver or other implementing hardware. The detection in step 604 may be performed by a number of means including: monitoring the data bus for communications when the transceiver is transitioning into an idle transmission state or sending a signal to the transceiver to prompt for a reply containing information on the current transmission rate setting. At steps 605 and 606, if the detected transmission rate does not equal the lower of the possible data rates, the controller configures the transceiver or implementing hardware to operate at the lower of the possible data rates.

Figure 7:
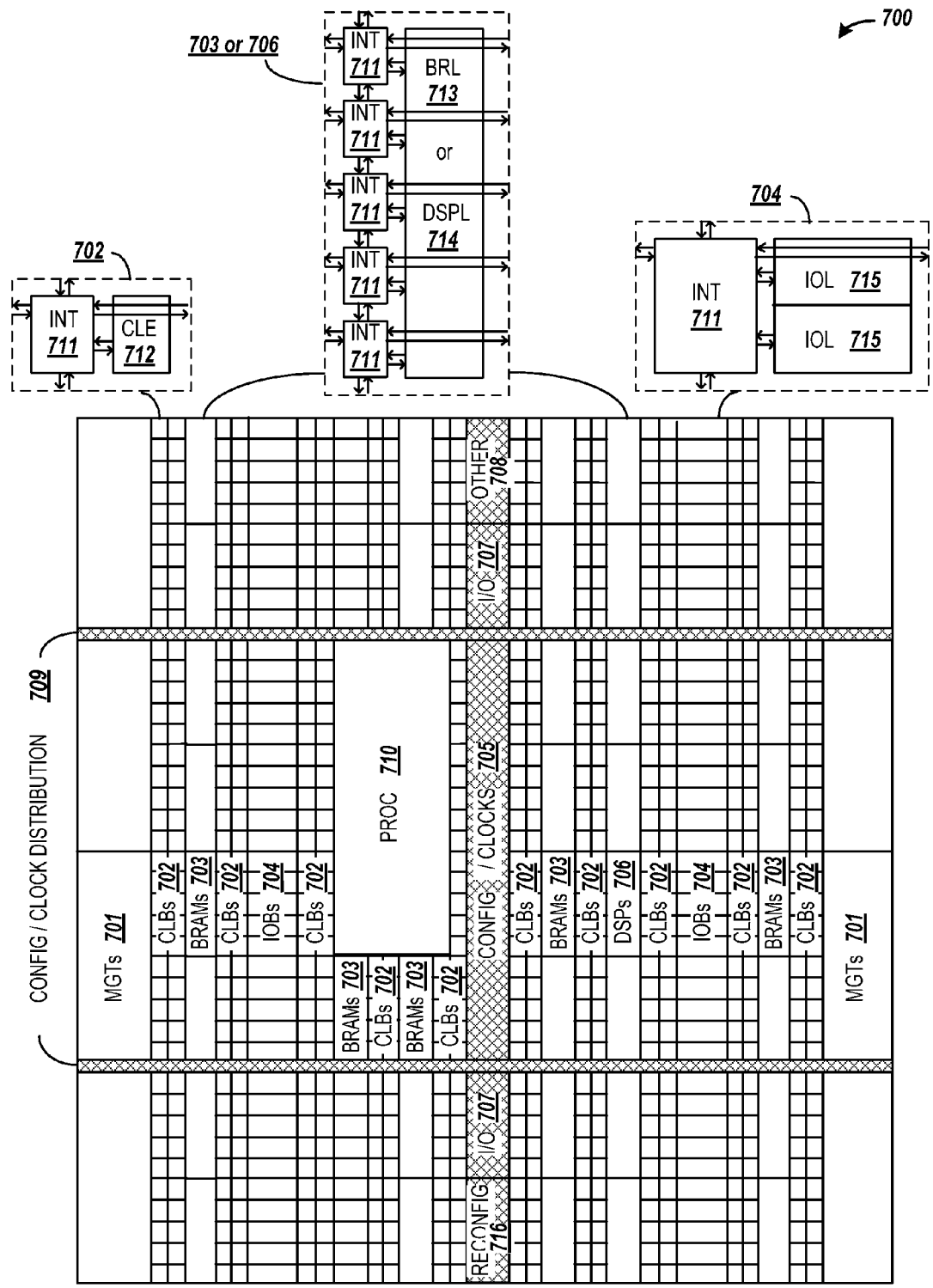
FIG. 7 illustrates a block diagram of a programmable integrated circuit for implementing a data bus controller in accordance with various embodiments of the invention.

FIG. 7 is a block diagram of an example programmable integrated circuit that may be used in implementing a data bus controller in accordance with various embodiments of the invention. A data bus controller, as previously described, may be implemented on the programmable logic and interconnect resources of programmable integrated circuit.

FPGAs can include several different types of programmable logic blocks in the array. For example, FIG. 7 illustrates an FPGA architecture 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, a reconfiguration port (RECONFIG) 716, specialized input/output blocks (I/O) 707, for example, e.g., clock ports, and other programmable logic 708 such as digital clock managers, analog-to-digital converters, system monitoring logic, and so forth. Some FPGAs also include dedicated processor blocks (PROC) 710.

In some FPGAs, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic plus a single programmable interconnect element NT 711. A BRAM 703 can include a BRAM logic element (BRL) 713 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 706 can include a DSP logic element (DSPL) 714 in addition to an appropriate number of programmable interconnect elements. An IOB 704 can include, for example, two instances of an input/output logic element (IOL) 715 in addition to one instance of the programmable interconnect element INT 711. As will be clear to those of skill in the art, the actual I/O pads connected, for example, to the I/O logic element 715 are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments of the present invention.

Figure 8:
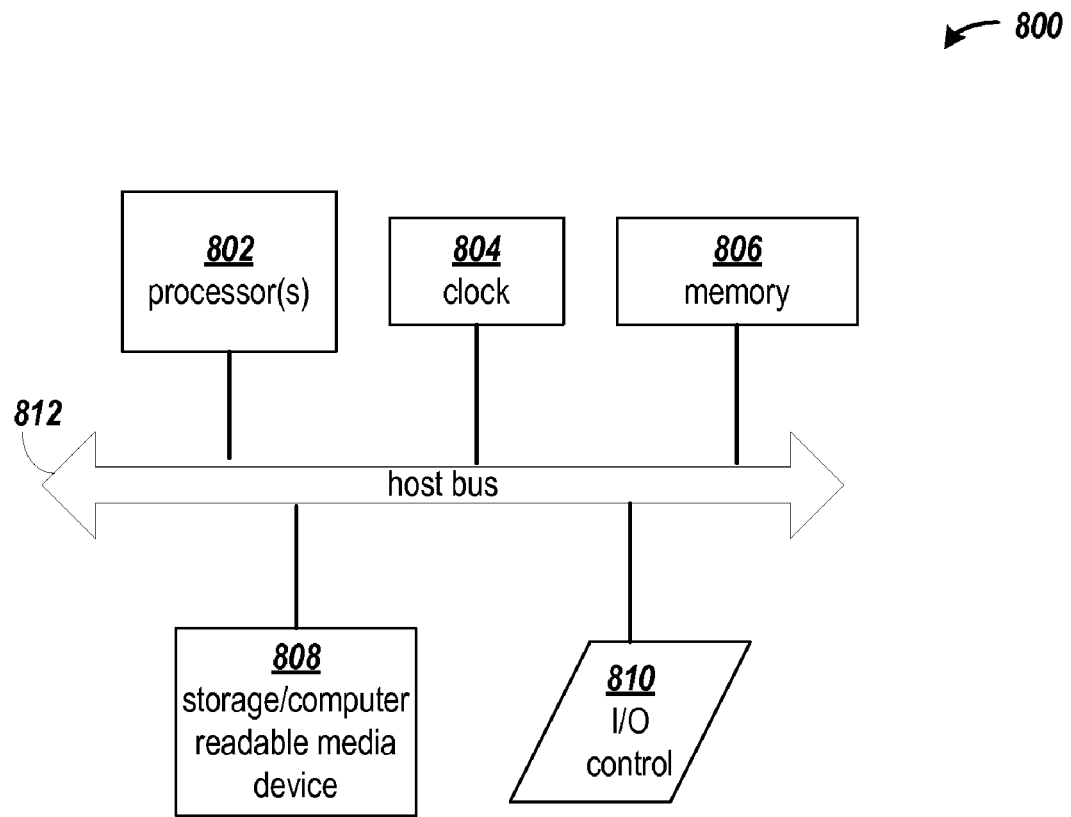
FIG. 8 illustrates a block diagram of a general purpose processor computing arrangement for implementing a data bus controller in accordance with various embodiments of the invention.

FIG. 8 is a block diagram of an example computing arrangement on which the processes described herein may be implemented using a general purpose processor. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory unit 806, a storage unit 808, and an input/output control unit 810 coupled to host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 802 may be one or more general purpose processors, or a combination of one or more general purpose processors and suitable co-processors, or one or more specialized processors (e.g., RISC, CISC, pipelined, etc.).

The memory arrangement 806 typically includes multiple levels of cache memory, a main memory. The storage arrangement 808 may include local and/or remote persistent storage such as provided by magnetic disks (not shown), flash, EPROM, or other non-volatile data storage. The storage unit may be read or read/write capable. Further, the memory 806 and storage 808 may be combined in a single arrangement.

The processor arrangement 802 executes the software in storage 806 and/or memory 808 arrangements, reads data from and stores data to the storage 806 and/or memory 808 arrangements, and communicates with external devices through the input/output control arrangement 810. These functions are synchronized by the clock signal generator 804. The resource of the computing arrangement may be managed by either an operating system (not shown), or a hardware control unit (not shown).

The present invention is thought to be applicable to a variety of systems for a data bus controller. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of operating a data bus controller coupled to a bus via a transceiver circuit, comprising:
   monitoring the bus for presence of a device while the bus controller and the transceiver circuit are in a first state;
   wherein the transceiver circuit does not transmit data over the bus while in the first state;
   transitioning from the first state to a second state in response to presence of a device on the bus;
   while the bus controller is in the second state, opening, configuring and monitoring communications with devices coupled to the bus, and further communicating with the devices at two or more transmission rates including a first rate that is lower than a second rate;
   transitioning the bus controller and transceiver circuit from the second state to a third state in response to conditions on the bus indicating that all communications on the bus have ceased or need to be stopped; and
   closing communication channels and configuring the controller and transceiver circuit to operate at the first transmission rate while the bus controller and transceiver circuit are in the third state, and transitioning the bus controller into the first state in response to completing configuration of the transmission rate;
   wherein configuring the controller to operate at the first transmission rate includes:
      detecting a current transmission rate; and
      setting the transmission rate to the first rate if a higher rate is detected;
   wherein setting the transmission rate of the controller includes:
      sending a control signal from the controller to the transceiver circuit; and
      waiting to set the transmission rate until the transceiver circuit sends a signal confirming configuration of the transmission rate has completed.

2. The method as in claim 1 further comprising, configuring the controller, while the controller is in the third state, to operate in a low power mode.

3. The method as in claim 2, wherein configuring the controller to operate in a low power mode comprises:
   sending a control signal from the controller to the transceiver circuit; and
   waiting to configure the controller to operate in the low power mode until the transceiver circuit sends a signal confirming the transceiver circuit is operating in an idle transmission state.

4. A method of operating a controller of a transceiver coupled to a bus, comprising:
   monitoring the bus for presence of a device while the bus controller and the transceiver are in a first state;
   wherein the transceiver does not transmit data over the bus while in the first state;
   transitioning from the first state to a second state in response to presence of a device on the bus;

while the controller and transceiver are in a second state and prior to opening, closing, configuring and monitoring transceiver communications with devices coupled to the bus, configuring the controller and transceiver to operate at a lowest transmission rate of two or more transmission rates used by the controller and transceiver, and transitioning the controller and transceiver into a third state in response to completing configuration of the controller and transceiver, wherein configuring the controller and transceiver to operate at a lowest transmission rate includes:

detecting the two or more transmission rates; and setting the lowest transmission rate to a lowest rate of the two or more transmission rates;

wherein the configuring the transmission rate of the controller and the transceiver comprises sending a control signal from the controller to the transceiver, and waiting to set the transmission rate of the controller until the transceiver sends a signal confirming configuration of the transmission rate has completed;

while the controller is in the third state, opening, closing, configuring and monitoring transceiver communications with devices coupled to the bus, and further operating the transceiver to communicate with the devices on the bus; and transitioning the controller and transceiver from the third state to the first state in response to conditions on the bus indicating that all communications on the bus have ceased or need to be stopped.

5. A data bus circuit, comprising:

a transceiver circuit that operates in a first data rate or a second data rate;

wherein the first data rate is lower than the second data rate; and a controller circuit, coupled to the transceiver circuit, wherein the controller circuit operates in and sets the transceiver to a plurality of states, including an idle transmission state or an active transmission state, wherein in response to one of: a cessation of communications or an indication to terminate communications, the controller circuit configures the transceiver circuit to operate at the first data rate followed by setting the transceiver circuit to the idle transmission state and transitioning to the idle transmission state;

wherein the transceiver circuit does not transmit data over the bus while in the idle state;

wherein the controller circuit is configured to:

detect a current transmission rate of the transceiver circuit; and configure the transmission rate of the transceiver circuit to the first rate in response to the detection of a different rate;

wherein the controller circuit is further configured to configure the transmission rate of the transceiver circuit by:

sending a control signal from the controller circuit to the transceiver circuit; and waiting until the transceiver circuit sends a signal confirming configuration of the transmission rate has completed.

6. The data bus circuit of claim 5, wherein the controller circuit configures the transceiver circuit to operate at the first data rate when the controller circuit exits any state immediately preceding entry into the controller circuit's idle transmission state.

7. The data bus circuit of claim 5, wherein the controller circuit is implemented on a field programmable gate array.

8. The data bus circuit of claim 5, wherein the controller circuit is implemented on a processor computing arrangement.

9. The data bus circuit of claim 5, wherein the controller circuit is implemented on a microcontroller.

10. The data bus circuit of claim 5, wherein the controller circuit configures the transceiver circuit to operate in a low power mode.

* * * * *